United States Patent [19]
Disson et al.

[11] Patent Number: 6,119,405
[45] Date of Patent: Sep. 19, 2000

[54] MOTOR VEHICLE BODY PART AND METHOD OF MAKING A VEHICLE BODY ASSEMBLY

[75] Inventors: Arno Disson, Sindelfingen; Wolfgang Much, Boeblingen, both of Germany

[73] Assignee: DaimlerChrysler AG, Stuttgart, Germany

[21] Appl. No.: 09/189,795

[22] Filed: Nov. 12, 1998

[30] Foreign Application Priority Data

Nov. 14, 1997 [DE] Germany .......................... 197 50 448

[51] Int. Cl.[7] ........................................... B60J 5/04
[52] U.S. Cl. .................... 49/502; 52/735.1; 296/146.5
[58] Field of Search .......................... 49/502; 296/146.5, 296/202; 52/735.1, 736.1

[56] References Cited

U.S. PATENT DOCUMENTS

| 1,826,440 | 10/1931 | Tarbox | 296/146.5 |
|---|---|---|---|
| 4,509,293 | 4/1985 | Ufrecht et al. | 49/502 |
| 4,621,453 | 11/1986 | Watanabe et al. | |
| 5,168,668 | 12/1992 | Mishima et al. | |

FOREIGN PATENT DOCUMENTS

| 0582499B1 | 2/1994 | European Pat. Off. | |
|---|---|---|---|
| 3611487A1 | 10/1987 | Germany . | |
| 3642436A1 | 6/1988 | Germany . | |
| 2535508C3 | 4/1989 | Germany . | |
| 4447322A1 | 3/1996 | Germany . | |
| 3208726 | 9/1991 | Japan | 49/502 |

OTHER PUBLICATIONS

Patent Abstracts of Japan, Oct. 15, 1996, Sealing Device for Vehicle 08268179A.

*Primary Examiner*—Jerry Redman
*Attorney, Agent, or Firm*—Evenson, McKeown, Edwards & Lenahan, P.L.L.C.

[57] ABSTRACT

A window guide for a side window of a motor vehicle side door in the vicinity of a door frame includes a frame profile, an inner cladding, and an outer cladding. The frame profile is made Z-shaped throughout, with an inner Z-leg flanking the window glazing being secured to a parallel connecting flange of the inner cladding and an outer Z-leg pointing away from the window glazing being attached flush to a parallel inner surface of the outer cladding.

15 Claims, 2 Drawing Sheets

MOTOR VEHICLE BODY PART AND METHOD OF MAKING A VEHICLE BODY ASSEMBLY

BACKGROUND AND SUMMARY OF THE INVENTION

This application claims the priority of German application 197 50 448.5, filed in Germany on Nov. 14, 1997, the disclosure of which is expressly incorporated by reference herein.

The invention relates to a motor vehicle body part with window glazing guided in a body part frame, said frame being composed of a frame profile as well as inner cladding and outer cladding, connected with the frame profile.

A motor vehicle part of this kind is known from European Patent Document EP 0 582 499 B1. The motor vehicle body part in this prior art is a movable body part in the form of a front side door. The side door has a door frame composed of outer cladding, a C-shaped frame profile, and inner cladding. The C-shaped frame profile is attached to the outer cladding and to the inner cladding to guide the side window glazing.

A goal of the invention is to provide a motor vehicle body part of the species recited at the outset that employs simple means to create a stable and flow-favorable design in the vicinity of the window glazing.

This goal is achieved according to preferred embodiments of the invention by virtue of the fact that the frame profile is shaped like a Z throughout, with an internal Z-leg that flanks the window glazing being secured to a parallel connecting flange of the internal cladding and with an external Z-leg pointing away from the window glazing being attached flush to a parallel inner surface of the outer cladding. Because of the continuous design of the Z-shaped frame profile, the latter is closed all the way around, creating a high degree of dimensional stability for the guide channel formed for the window glazing. Penetration of sound and leaks in the vicinity of the motor vehicle body part frame are avoided as a result. The flush attachment of the outer Z-leg to the inside surface of the outer cladding in an area that faces away from the marginal area of the outer cladding in the vicinity of the window glazing permits a simpler and more flow-favorable design for the marginal area of the outer cladding than is the case in the prior art.

In the prior art, a fold is formed in a marginal area of the outer cladding that surrounds the outer C-leg of the frame profile, producing a triple material strength at this point. With the solution according to the invention, therefore, it is possible to displace the window glazing as far as possible toward the outer contour of the motor vehicle body, producing a flow-favorable design for the vehicle body. The flow-favorable design is thus achieved by the (only slight) step transition between the window glazing and the outer cladding at the level of the marginal area of the outer cladding.

The application of the outer Z-leg to the inner surface of the outer cladding also allows additional reinforcement of the outer cladding in this area. Another important advantage of the solution according to the invention is that the connection of the Z-shaped frame profile with the inner cladding and outer cladding can be accomplished by using extremely simple manufacturing techniques, especially simple welding devices, in the vicinity of the inner cladding.

In one embodiment of the invention, the flush attachment of the Z-leg to the outer cladding is designed as a glued joint. This is an especially simple and esthetically appealing solution since the exterior of the outer cladding is not adversely affected by welds.

In another embodiment of the invention, a marginal area of the outer cladding that covers the window glazing is provided with an inwardly directed circumferential fold. As a result, the outer cladding is reinforced in this area.

In another embodiment of the invention, the fold is provided with a plurality of reinforcing tabs that are distributed at uniform intervals around its circumference and project inward, said tabs resting flush against a middle rib of the Z-shaped frame profile and connected therewith. These supporting tabs serve to secure the Z-shaped frame profile in the event that the outer Z-leg is glued to the outer cladding. The supporting tabs create a secure positioning of this Z-leg to the inner surface of the outer cladding until the adhesive has cured completely so that damage to the glued connection is reliably prevented.

In another embodiment of the invention, the middle rib of the Z-shaped frame profile has embossed areas that run parallel at the level of the supporting tabs, and whose width is greater than the width of the supporting tabs. These embossed areas create a secure and flush contact for the supporting tabs. The fact that the embossed areas are made wider than the supporting tabs makes it possible also to compensate for tolerances between the frame profile and the outer cladding. The embossed areas are adjusted to the thickness of the supporting tabs in such fashion that the depth of the embossed areas corresponds to the thickness of the supporting tabs. As a result, the supporting tabs do not project beyond the contour of the Z-profile, resulting in an essentially constant depth of the guide channel for the window glazing.

In another embodiment of the invention, the supporting tabs are connected with the embossed areas by spot welds. This is an especially simple and economical mode of connection. in another embodiment of the invention, the fold in the vicinity of the outer cladding is made in the form of a doubling of the material of the outer cladding. This folding of the marginal area onto itself thus permits a reduced step (relative to the prior art) between the exterior of the window glazing and the exterior of the outer cladding, producing a more flow-favorable design for the motor vehicle body part.

Other objects, advantages and novel features of the present invention will become apparent from the following detailed description of the invention when considered in conjunction with the accompanying drawings.

DETAILED DESCRIPTION OF THE DRAWINGS

Figure 1:
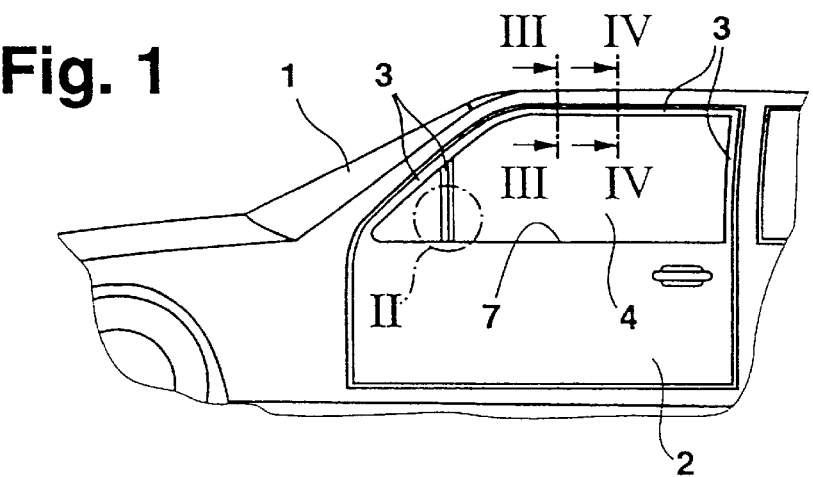
FIG. 1 shows schematically a side view of an automobile in the vicinity of an embodiment according to the invention of a side door that serves as a motor vehicle body part.

According to FIG. 1, an automobile has a side door 2 that serves as a movable motor vehicle body part, with an additional identically designed side door 2 being located on the opposite side of the vehicle and hence, as viewed in the direction of travel, on the right adjacent to a windshield 1.

Side door 2 has a door frame 3 that delimits a sight opening closed by a window glazing 4. A lower edge of the sight opening closed by window glazing 4 and delimited laterally as well as above by door frame 3 is delimited by a vehicle side edge 7. Window glazing 4 is movably mounted inside side door 2 between a lowered position that opens the sight opening and an upper end position that closes the sight opening. To guide the window a guide channel (FIGS. 3 and 4) is provided in door frame 3 that grips the edge of window glazing 4, said channel being composed of a Z-shaped frame profile 9 and a marginal area of an outer cladding 15 in a manner described in greater detail below. In addition, a vertical supporting rib is shown that delimits a forward window triangle of side door 2, said rib forming the guide for window glazing 4 in this area (see section II in FIGS. 1 and 2). In the vicinity of vehicle side edge 7, a side edge reinforcement 5 is provided that runs lengthwise of the vehicle and is connected by welds 6 in FIG. 2 in a manner not shown in greater detail with outer cladding 15 and also with frame section 8, 9, 10.

Figure 2:
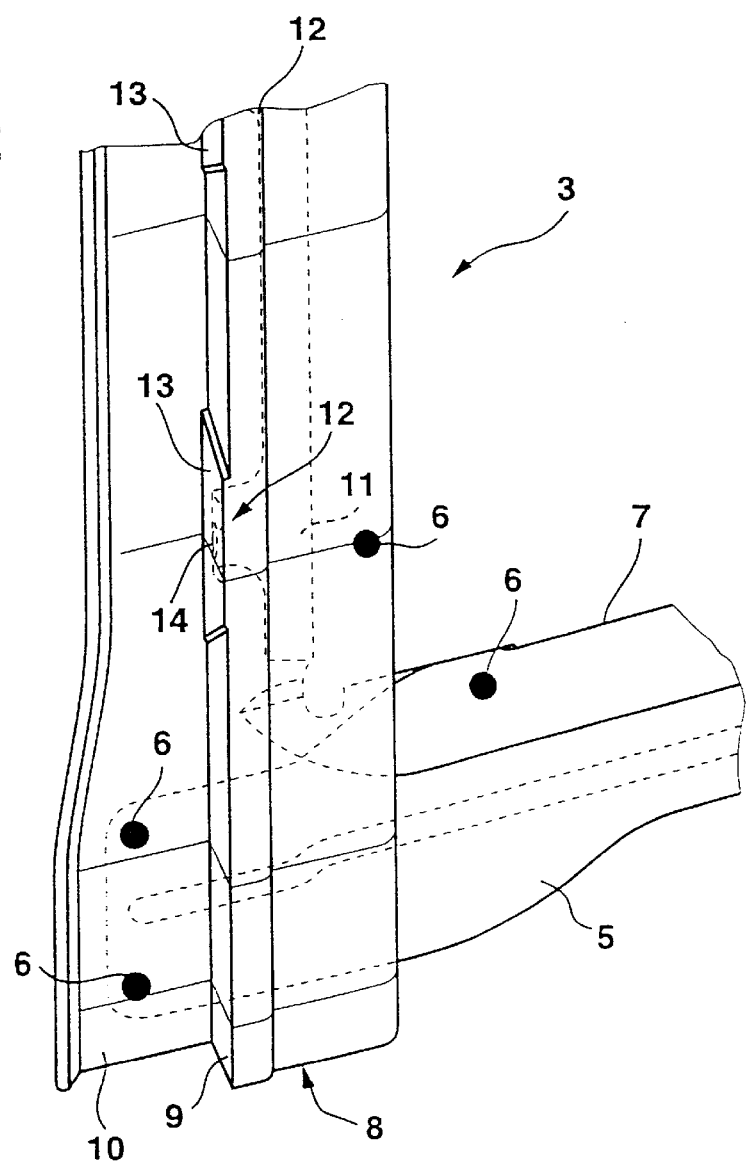
FIG. 2 is a perspective view, looking from the vehicle interior, of a portion of the side door according to FIG. 1 in the area marked by dot-dashed circle II.
Figure 3:
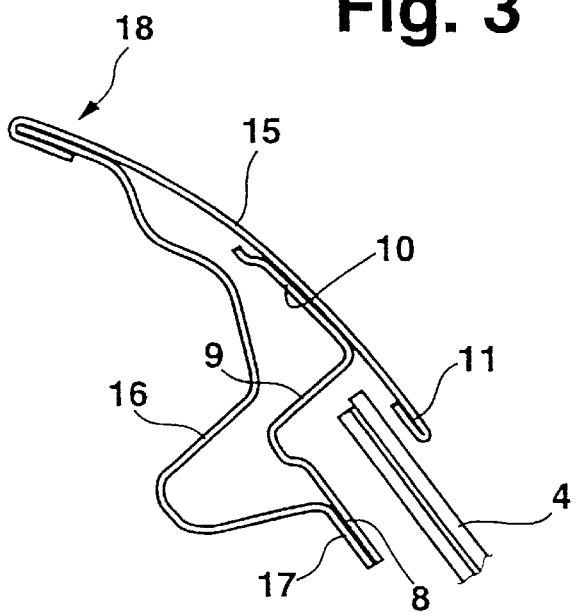
FIG. 3 is a section through an upper door frame portion of the side door in FIG. 1 along section line III—III in FIG. 1.
Figure 4:
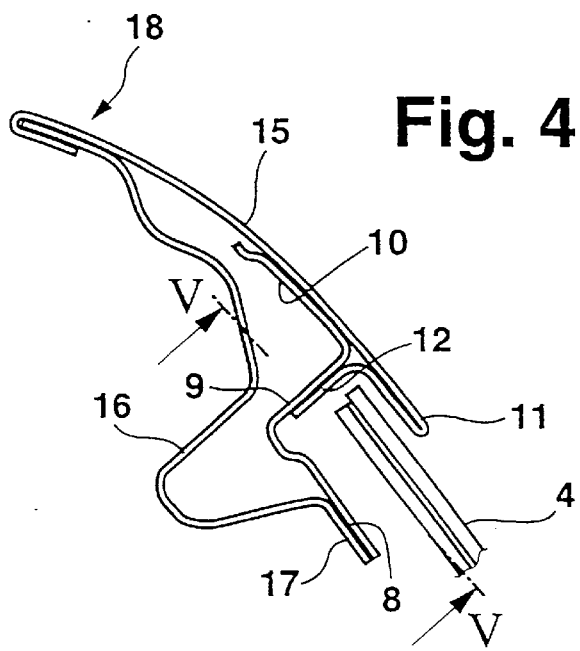
FIG. 4 is another section through the upper door frame portion along section line IV—IV in FIG. 1.
Figure 5:
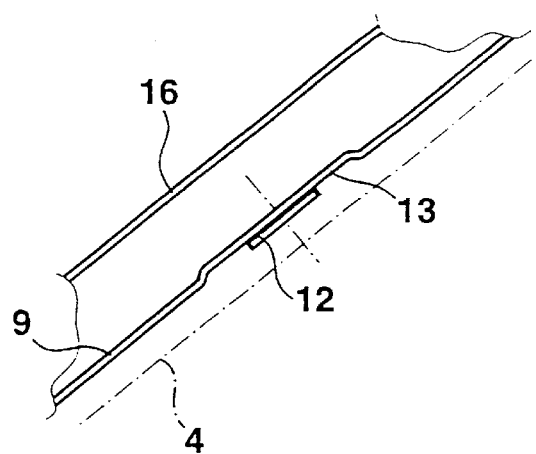
FIG. 5 is a section through the door frame area in FIG. 4 along section line V—V in FIG. 4.

Frame section 8, 9, 10 is Z-shaped and designed to be continuous over the entire length of door frame 3, and is connected on both sides of the sight opening for window glazing 4 with side edge reinforcement similarly to the illustration in FIG. 2. The side edge reinforcement 5 and frame profile 8, 9, 10 serve to guide window glazing 4. Over the entire length of door frame 3, Z-shaped frame profile 8, 9, 10 is connected with an inner cladding 16 and an outer cladding 15 (FIGS. 3 to 5). The Z-shaped frame profile has an inner Z-leg 8 which extends at the level of window glazing 4 parallel to the latter in such fashion that it flanks it. This inner Z-leg 8 is connected with a surrounding connecting flange 17 of inner cladding 16 by spot welds (upper spot weld 6 in FIG. 2). The inner cladding 16 is folded together with outer cladding 15 at its opposite end area in the vicinity of a door frame edge 18.

The internal Z-leg 8 merges with a central rib 9 by means of a profile in the shape of a lengthwise bead, said rib adjoining Z-leg 8 nearly at right angles and flanking an end edge of window glazing 4. Middle rib 9 is guided outward approximately at right angles to outer cladding 15 and blends with an external Z-leg 10 that fits flush against a matching inner surface of outer cladding 15 and is glued to the latter. The free edge of Z-leg 10 is provided with a reinforcing rib, not shown in greater detail. Frame profile 8, 9, 10 constitutes a sheet metal profile made in one piece. The outer Z-leg extends from window glazing 4 to door edge 18. Outer cladding 15 has a marginal area that covers window glazing 4, said area being reinforced by an inwardly bent fold 11. In FIGS. 3 and 4, a space is formed between window glazing 4 and outer cladding 15 and/or middle rib 9 and inner Z-leg 8. This space is filled in known fashion by a window gasket, omitted here for the sake of clarity.

If complete curing of the adhesive between Z-leg 10 and outer cladding 15 is possible during production, the guide channel in the door frame 3 is designed as shown in FIG. 3. However, if further body working steps still must be performed during the curing process, the glued joint between Z-leg 10 and outer cladding 15 could be damaged by slight movements or vibrations of frame profile 8, 9. To avoid this, in the embodiment shown in FIG. 4, a plurality of supporting tabs 12 are provided in the vicinity of fold 11 of outer cladding 15, said tabs being distributed at uniform intervals around the circumference of door frame 3 and projecting inward parallel to middle rib 9, said tabs further being connected with middle rib 9 by spot welds 14. In order to permit a flush fit of supporting tabs 12 in the vicinity of middle rib 9, middle rib 9 is provided with embossed areas 13 at the level of supporting tabs 12, which are designed as shown in FIGS. 2 and 5 and have a depth that corresponds to the thickness of supporting tabs 12. The width of embossed areas 13 is approximately twice as great as the width of the associated supporting tabs 12 so that tolerances between outer cladding 15, 11, 12 and frame profile 8, 9, 10, 13 can be compensated without adversely affecting the flush connection of supporting tabs 12 in the vicinity of embossed areas 13. These supporting tabs 12 that are welded to the middle rib 9 of frame profile 8, 9, 10 allow a secure positioning of the Z-leg 10 at the inner surface of outer cladding 15 even when additional worksteps are performed on side door 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle body part with a window glazing guided in a body part frame, which is composed of a frame profile as well as an inner cladding and an outer cladding which are connected with the frame profile wherein the frame profile is designed with a Z-shape throughout, with an inner Z-leg flanking the window glazing being secured to a parallel connecting flange of the inner cladding and outer Z-leg facing away from the window glazing being attached flush to a parallel inner surface of the outer cladding, wherein a marginal area of the outer cladding that covers the window glazing is provided with an inwardly directed surrounding fold, and wherein the fold is provided with a plurality of supporting tabs that are distributed at equal intervals around the circumference and project inward, said tabs fitting flush against a middle rib of the Z-shaped frame profile and connected therewith.

2. Motor vehicle body part according to claim 1, wherein the middle rib of the Z-shaped frame profile has embossed areas at the level of the supporting tabs embossed areas that run parallel and whose width is greater than the width of the supporting tabs.

3. Motor vehicle body part according to claim 2, wherein the supporting tabs are connected with the embossed areas by spot welds.

4. Motor vehicle body part according to claim 1, wherein the fold in the marginal area of the outer cladding is designed as a doubling of the material of the outer cladding.

5. Motor vehicle body part with a window glazing guided in a body part frame, which is composed of a frame profile as well as an inner cladding and an outer cladding which are connected with the frame profile wherein the frame profile is designed with a Z-shape throughout, with an inner Z-leg flanking the window glazing being secured to a parallel connecting flange of the inner cladding and an outer Z-leg facing away from the window glazing being attached flush to a parallel inner surface of the outer cladding, wherein the flush attachment of the Z-leg to the outer cladding is in the form of a clued joint, wherein a marginal area of the outer cladding that covers the window glazing is provided with an inwardly directed surrounding fold, and wherein the fold is provided with a plurality of supporting tabs that are distributed at equal intervals around the circumference and project inward, said tabs fitting flush against a middle rib of the Z-shaped frame profile and connected therewith.

6. Motor vehicle body part according to claim 5, wherein the fold in the marginal area of the outer cladding is designed as a doubling of the material of the outer cladding.

7. Motor vehicle body assembly comprising:

a window glazing, and a body part frame guidably supporting the window glazing, wherein said body part frame surrounds a passenger viewing opening which is closable by said window glazing, wherein said body part frame includes:
a frame profile,
an inner cladding connected to the frame profile, and
an outer cladding connected to the frame profile, wherein said frame profile is designed with a Z-shape over its extent around the viewing opening, with an inner Z-leg flanking the window glazing being secured to a parallel connecting flange of the inner cladding and an outer Z-leg facing away from the window glazing being attached flush to a parallel inner surface of the outer cladding.

8. Motor vehicle assembly according to claim 7, wherein the flush attachment of the Z-leg to the outer cladding is in the form of a glued joint.

9. Motor vehicle assembly according to claim 7, wherein a marginal area of the outer cladding that covers the window glazing is provided with an inwardly directed surrounding fold.

10. Motor vehicle assembly according to claim 9, wherein the fold is provided with a plurality of supporting tabs that are distributed at equal intervals around the circumference and project inward, said tabs fitting flush against a middle rib of the Z-shaped frame profile and connected therewith.

11. Motor vehicle assembly according to claim 10, wherein the middle rib of the Z-shaped frame profile has embossed areas at the level of the supporting tabs embossed areas that run parallel and whose width is greater than the width of the supporting tabs.

12. Motor vehicle assembly according to claim 11, wherein the supporting tabs are connected with the embossed areas by spot welds.

13. Motor vehicle assembly according to claim 9, wherein the fold in the marginal area of the outer cladding is designed as a doubling of the material of the outer cladding.

14. Motor vehicle assembly according to claim 7, wherein the inner cladding, outer cladding and z-shaped frame profile form the boundaries of a closed box defining the body part frame.

15. Motor vehicle assembly according to claim 14, wherein a middle rib of the z-shaped frame profile extends substantially perpendicular to a plane defining a surface of the window glazing.

* * * * *